Aug. 11, 1931.                    H. HEINE                    1,818,252
                               LIGHTING FIXTURE
                              Filed Dec. 6, 1928

Henry Heine
  Inventor.
By: Erich J. Michaelis
  His Attorney.

Patented Aug. 11, 1931

1,818,252

UNITED STATES PATENT OFFICE

HENRY HEINE, OF CHICAGO, ILLINOIS

LIGHTING FIXTURE

Application filed December 6, 1928. Serial No. 324,156.

The invention relates to lighting fixtures and especially to that type of lighting fixtures built and constructed for the purpose of increasing the efficiency of the lamp used in connection with said fixture.

Lighting fixtures having means for increasing the illuminating power of the lamp in the fixture are known and have been used heretofore. This means usually consists in a reflection surface arranged in back of and sometimes also about the lamp so that the rays of light originated by said lamp would be reflected as far as possible in one direction only. But in all fixtures equipped with these reflectors the light was not concentrated enough.

In order to overcome the spreading of the light condenser lenses have been placed in front of the lamp to condense or concentrate the light rays.

The object of the present invention is to utilize as far as possible all light rays by condensing and reflecting the same in one direction only.

A further object of the invention is to provide a light fixture having a plurality of sets of condenser lenses arranged about the source of light and having for each set a reflector which will throw the condensed light rays in a predetermined direction.

Another object of the invention is to provide a light fixture having in addition to the sets of condenser lenses and reflectors mentioned above a set of condenser lenses in front of said source of light.

Other objects of the invention not specifically mentioned may be easily ascertained and understood from the following description in connection with the accompanying drawings forming a part thereof. It is however to be noted that the description and drawings represent a preferred embodiment of the invention only and that the invention is not to be limited or restricted to the exact construction and formation shown in the drawings but that said invention is only to be limited by the scope of the claim appended hereto.

Figure 1:
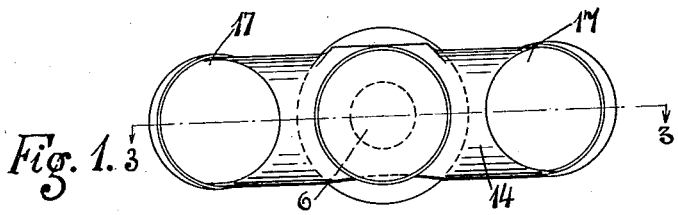
Fig. 1 is a top view of a lighting fixture according to the present invention adapted to be used in connection with a so called pocket flash light.
Figure 2:
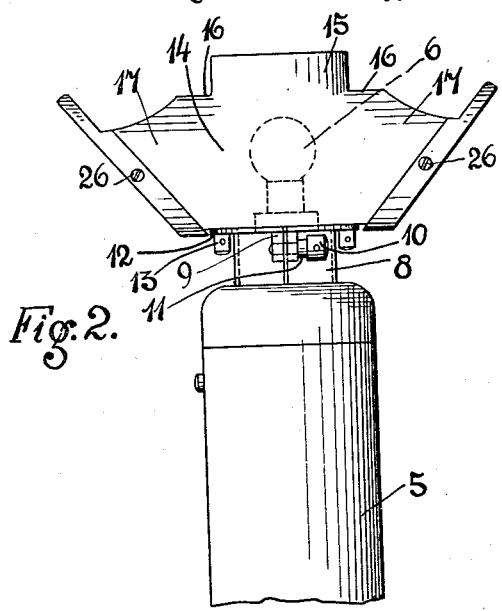
Fig. 2 is a side view of Fig. 1.
Figure 3:
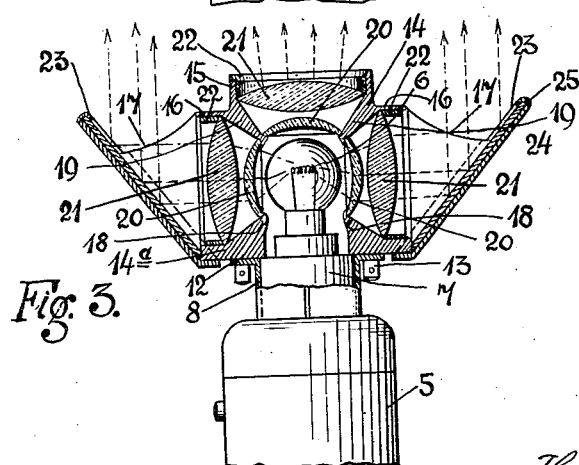
Fig. 3 is a sectional view taken on line 3—3 of Fig. 1.

The flash light illustrated in the drawings has the well known casing 5 common to pocket torches and adapted to receive a set of well known dry electric elements. An electric lamp 6 is inserted into the said casing and electrically connected with said elements in a well known manner. Since the body of the torch, the electric bulb, the elements and the means for connecting said elements and bulb do not constitute any parts of the invention, they are partly only indicated in the drawings, partly not shown at all, and are not described in detail.

To attach the lighting fixture forming the subject of the present invention to said casing or body the latter is provided with a reduced neck 7. A clamping ring 8 is adapted to surround said neck. Said ring is open on one place and adjacent this opening or slit a pair of lugs 9 is located being integral parts of said ring. Said lugs are provided with registering holes and one of said holes is tapped (not shown). A clamping screw 10 has a shoulder 11, so that by tightening said screw the clamping ring may be adjustably and removably attached to said neck. On its upper rim the ring has a circumferential flange 12 extending at right angles to said ring. A plurality of screws 13 extend through said flange and serve to hold the lighting fixture proper, respectively the body 14 thereof in position. This body has a bottom portion 14a provided with a centrally located opening permitting the electric bulb to extend into the body of the fixture. The body has in the case illustrated in the drawings in general the shape of an inverted T. In front of the electric bulb the body has a short tubular portion 15 permitting the light rays flowing from the lamp to fall forwardly thereof. On diametrically opposite sides of said lamp the body has extensions 16 having also tube like shapes. It should be mentioned here, that the shape of the body and the arrangement of the tubular extensions located laterally of the bulb depend on the number of such extensions, which may be varied as suitable and desired. If for instance three such extensions should be desired said extensions would be preferably arranged at equal angular distances about said bulb. It is easy to be seen, that no matter how many extensions should be desired, they would always be arranged and distributed equally about the circumference of the forward extension 15.

From the ends of the extensions 16 wing portions 17 extend diametrically of the axis of the device. As shown in the drawings the outward rim of each of said pair of wings extends at an angle to said axis and the top view of the apparatus shows that, the end of the extension 16 together with the wing extensions of said lateral tubes will form a circular forwardly looking opening.

On the bottom 14a of the body extensions 18 are formed and extend inwardly of said body. From the junction of the forward and the side tubes ribs 19 extend inwardly of said body and the ends of said ribs and said extensions 18 are adapted to hold concavo-convex lenses 20 in position. In front of and spaced from each of said lenses a bi-convex lens 21 is arranged and held in position by a clamp ring 22 inserted in the tubular extensions 15 and 16.

Reflecting mirror 23 is arranged against the end of the wings 17 and may be held in position by being set into a frame 24 having a rim 25 engaging the top and the side edges of the mirror. The rim 24 extends somewhat above the surface of the mirror and is adapted to engage the metal of the wings 17 on which said frames are then fastened by means of screws 26. The mirror is provided from sliding out of said frames by the lower edge of the mirror abutting the outward edge of the bottom 14a of the body.

The invention operates as follows: When the source of light is energized the forward flowing rays will go through the two condenser lenses 20 and 21 arranged in front of the electric bulb and will be deflected by said lenses to flow as far as possible parallel to each other.

It is easy to see that it is only a matter of selecting the condenser lenses to decide if said rays should be more or less concentrated.

The rays of light going sidewardly from the electric bulb will be deflected by the condenser lenses arranged about the bulb in such a manner that said rays will all flow in parallel direction before meeting the reflecting surface of the mirror 23 so that said rays are then also reflected parallel to each other. The angle in which the mirrors will be arranged in relation to the axis of the device may be selected with respect to the direction in which the condensed light rays are to be reflected.

In this manner it can be easily determined, if said lateral light rays shall be reflected parallel through the openings formed by the wing portions or if they should be reflected to meet the light rays flowing forwardly from the source of light in any predetermined distance.

Having described my invention and how the same is to be performed I claim as new and desire to secure Letters Patent:

In an electric pocket torch the combination of a battery box having a neck at one of its ends, a clamping ring adapted to be removably fastened about said neck, a flange on said clamping ring, an electric bulb, a socket formed on the end of the neck and adapted to receive the bulb, a body having a bottom portion with a hole therein permitting the bulb to extend into the body, a plurality of screws extending through the flange of the clamp ring and into the bottom of the body for removably holding the body in position on the battery box, and a plurality of lenses and reflectors cooperating with each other arranged in the body so as to surround the bulb, when the bulb is held in position by the screws.

In witness whereof I affix my signature.
HENRY HEINE.